(12) United States Patent
Lescoche et al.

(10) Patent No.: US 12,383,868 B2
(45) Date of Patent: Aug. 12, 2025

(54) METHOD OF MANUFACTURING A SINGLE-PIECE COLUMN STRUCTURE FOR THE SEPARATION OF A FLUID MEDIUM

(71) Applicant: TECHNOLOGIES AVANCEES ET MEMBRANES INDUSTRIELLES, Nyons (FR)

(72) Inventors: Philippe Lescoche, Piegon (FR); Jérôme Anquetil, Vaison la Romaine (FR)

(73) Assignee: TECHNOLOGIES AVANCEES ET MEMBRANES INDUSTRIELLES, Nyons (FR)

( * ) Notice: Subject to any disclaimer, the term of this patent is extended or adjusted under 35 U.S.C. 154(b) by 486 days.

(21) Appl. No.: 17/841,915

(22) Filed: Jun. 16, 2022

(65) Prior Publication Data

US 2022/0305443 A1    Sep. 29, 2022

Related U.S. Application Data

(62) Division of application No. 15/575,916, filed as application No. PCT/FR2016/051234 on May 25, 2016, now abandoned.

(30) Foreign Application Priority Data

May 29, 2015    (FR) .................................... 15 54913

(51) Int. Cl.
*B01D 63/06*    (2006.01)
*B01D 39/20*    (2006.01)
(Continued)

(52) U.S. Cl.
CPC ......... *B01D 63/063* (2013.01); *B01D 63/027* (2013.01); *B01D 63/06* (2013.01);
(Continued)

(58) Field of Classification Search
CPC .... B01D 63/063; B01D 63/027; B01D 63/06; B01D 63/061; B01D 67/0041;
(Continued)

(56) References Cited

U.S. PATENT DOCUMENTS 5,052,219 A  * 10/1991 Fery ...................... E21B 49/005
                                                    73/152.52
6,036,030 A  *  3/2000 Stone .................... B01D 63/063
                                                    210/500.36
(Continued)

FOREIGN PATENT DOCUMENTS

CA          2377255 A1 * 12/2000  ............. B01D 69/10
WO    WO-2014199062 A1 * 12/2014  ......... B01D 46/2429

OTHER PUBLICATIONS

English Translation of Patent Publication WO 2014199062-A1, published Dec. 18, 2014. (Year: 2014).*

*Primary Examiner* — Joseph W Drodge
(74) *Attorney, Agent, or Firm* — Ladas & Parry LLP; Malcolm J. MacDonald, Esq.

(57) ABSTRACT

A method of manufacturing a separator element for obtaining molecular and/or particulate separation by tangential flow of a fluid medium for treatment into a filtrate and a retentate, the element having a structure (2) of at least two porous rigid columns (3) made of the same material, positioned side by side to define, outside their outside walls, a volume (4) for recovering the filtrate, each column (3) presenting, internally, at least one open structure (5) for passing a flow of the fluid medium, opening out in one of the ends of the porous column for inlet of the fluid medium for treatment, and in the other end for outlet of the retentate. The element is a single-piece rigid structure (2) made as a single piece that is uniform and continuous throughout, without any bonds or exogenous additions.

28 Claims, 9 Drawing Sheets

(51) Int. Cl.
  *B01D 63/02* (2006.01)
  *B01D 67/00* (2006.01)
  *B01D 69/04* (2006.01)
  *B01D 71/02* (2006.01)
  *B33Y 10/00* (2015.01)
  *B33Y 70/00* (2020.01)
  *B33Y 70/10* (2020.01)
  *C04B 38/00* (2006.01)
  *B01D 69/08* (2006.01)
  *B28B 1/00* (2006.01)
  *B33Y 80/00* (2015.01)
  *C04B 111/00* (2006.01)

(52) U.S. Cl.
  CPC ....... *B01D 63/061* (2013.01); *B01D 67/0041* (2013.01); *B01D 67/0067* (2013.01); *B01D 69/043* (2013.01); *B01D 71/02* (2013.01); *C04B 38/00* (2013.01); *C04B 38/0006* (2013.01); *B01D 39/2027* (2013.01); *B01D 39/2034* (2013.01); *B01D 39/2037* (2013.01); *B01D 63/066* (2013.01); *B01D 67/00* (2013.01); *B01D 69/082* (2013.01); *B01D 2313/02* (2013.01); *B01D 2313/21* (2013.01); *B28B 1/00* (2013.01); *B33Y 10/00* (2014.12); *B33Y 70/00* (2014.12); *B33Y 70/10* (2020.01); *B33Y 80/00* (2014.12); *C04B 38/0003* (2013.01); *C04B 2111/00801* (2013.01)

(58) Field of Classification Search
  CPC .. B01D 67/0067; B01D 69/043; B01D 71/02; B01D 39/2027; B01D 39/2034; B01D 39/2037; B01D 63/066; B01D 67/00; B01D 69/082; B01D 2313/02; B01D 2313/21; B01D 2239/086; B01D 2239/10; B01D 2239/1216; B01D 39/2044; B01D 39/2075; B01D 39/2086; B01D 69/046; B01D 63/065; B01D 67/0039; B01D 67/00415; B01D 69/04; B01D 71/0215; B01D 71/022; B01D 71/024; B01D 71/025; C04B 38/00; C04B 38/0006; C04B 38/0003; C04B 2111/00801; C04B 2111/00793; B28B 1/00; B28B 1/001; B33Y 10/00; B33Y 70/00; B33Y 70/10; B33Y 80/00

See application file for complete search history.

(56) References Cited

U.S. PATENT DOCUMENTS

| | | | |
|---|---|---|---|
| 10,369,745 B2* | 8/2019 | Lescoche | B01D 71/0215 |
| 11,806,893 B2* | 11/2023 | Lescoche | C04B 35/573 |
| 2003/0184954 A1* | 10/2003 | Fischer | B01D 63/061 |
| | | | 361/511 |
| 2004/0076874 A1* | 4/2004 | Nickel | B01D 63/062 |
| | | | 429/104 |
| 2004/0144712 A1* | 7/2004 | Stroh | B01D 63/0224 |
| | | | 210/321.89 |
| 2008/0203011 A1* | 8/2008 | Lescoche | B01D 63/061 |
| | | | 210/500.21 |
| 2011/0129640 A1* | 6/2011 | Beall | C04B 35/63492 |
| | | | 428/116 |
| 2012/0237745 A1* | 9/2012 | Dierkes | C04B 35/4885 |
| | | | 427/532 |
| 2014/0182253 A1* | 7/2014 | Zecchi | B01D 46/26 |
| | | | 55/495 |
| 2015/0027948 A1* | 1/2015 | Doyen | B01D 67/0002 |
| | | | 210/636 |
| 2021/0090901 A1* | 3/2021 | Pain | C25D 5/10 |

\* cited by examiner

METHOD OF MANUFACTURING A SINGLE-PIECE COLUMN STRUCTURE FOR THE SEPARATION OF A FLUID MEDIUM

This is a divisional application of U.S. application Ser. No. 15/575,916, filed Nov. 21, 2017, which is a 371 of International Application No. PCT/FR2016/051234, filed May 25, 2016, which claims priority to French Patent Application No. 15 54913, filed May 29, 2015, the contents of all of which are incorporated herein by reference.

The present invention relates to the technical field of tangential flow separator elements for separating a fluid medium for treatment into a filtrate and a retentate, which elements are commonly referred to as filter membranes.

Separation methods using membranes are used in numerous sectors, in particular in the environment for producing potable water and treating industrial effluents, in the chemical, petrochemical, pharmaceutical, and agrifood industries, and in the field of biotechnology.

A membrane constitutes a selective barrier and, under the action of a transfer force, it enables certain components of the medium for treatment to pass through or to be stopped. Whether components pass through or are stopped is the result of their size compared with the size of the pores in the membrane, which then behaves as a filter. Depending on the size of the pores, these techniques are referred to as microfiltration, ultrafiltration, or nanofiltration.

There exist membranes of various natures, structures, and textures. By way of example, ceramic membranes. In general, they are constituted by a porous substrate that provides the membrane with mechanical strength and that also gives it a shape, and thus determines the filter surface of the membrane. One or more layers having a thickness of a few micrometers for performing separation are deposited on the substrate, which layers can be referred to as separator layers, filter layers, separation layers, or active layers. During separation, the filtered fluid is transferred through the separator layer and the fluid then spreads out in the porous texture of the substrate in order to go towards the outside wall of the porous substrate. This portion of the fluid for treatment that has passed through the separator layer and the porous substrate is referred to as the permeate or the filtrate and it is recovered by a collector chamber or peripheral space surrounding the membrane and defined by a casing and plates for supporting the membranes. The other portion is referred to as the retentate and it is usually reinjected into the fluid for treatment upstream from the membrane via a recirculation loop.

In conventional manner, the substrate is initially fabricated with the desired shape by extrusion, and then sintered at a temperature and for a length of time that are sufficient to achieve the required strength, while nevertheless conserving in the resulting ceramic the desired open and interconnected texture of pores. That method makes it necessary to obtain one or more rectilinear channels within which the separator layers are subsequently deposited and sintered. The substrates are conventionally tubular in shape and have one or more rectilinear channels arranged in parallel with the central axis of the substrate.

In general manner, and as described for example in patent application FR 2 786 109, such membranes are used in a casing to form a filter module, which is thus constituted by a metal shell, usually of cylindrical shape, that is fitted at its ends with support plates having holes formed herein to receive the ends of the filter elements. Thus, in order to form a filter module, the filter elements are positioned inside the casing, extending parallel to one another. The filter elements are mounted in leaktight manner at each of their ends to the corresponding support plate via sealing gaskets.

The term "casing" means more precisely the assembly formed by a jacket, which is a generally cylindrical metal shell, fitted at each of its ends with a plate, more precisely referred to as a "head" plate, with holes formed therein to receive and position the ends of the filter elements in parallel inside the jacket.

Sealing between the filter elements and the head plate is obtained by a single gasket or by a plurality of individual gaskets. Specifically, prior art industrial modules come with gaskets of two types: namely single gaskets or individual gaskets.

A single gasket involves sealing all of the separator elements present in a casing by using a single part perforated by as many passages as there are separator elements. The separator elements are arranged in parallel inside the casing and they are positioned by the head plate, which has a number of passages equal to the number of filter elements. The filter elements project a little from the head plate, by a distance of the same order of magnitude as the thickness of the gasket. Above the gasket, a backing plate is placed for the purpose of compressing the gasket by means of clamping nuts. The backing plate possesses passages of axes that coincide with the axes of the head plate. These passages are of diameter that is slightly smaller than the outside diameter of the filter elements. The main parameters that contribute to designing this gasket are its thickness, defined by the portion of a filter element that penetrates inside the gasket, and also its hardness, as defined on the Shore hardness scale, that contributes to the flattening of the gasket while the backing plate is being clamped. The combination of hardness and thickness serves to define an amount of flattening, on which sealing depends.

Individual gaskets are placed around each of the filter elements. An individual gasket comprises a skirt that surrounds an end portion of a filter element. The end portion of the skirt may be cylindrical or conical. The skirt is extended by a top portion that covers a portion of the end of the filter element. This portion is arranged at the periphery of the end of the filter element and its inside diameter is determined so as to avoid obstructing the flow channels. As above, the casing includes a head plate with as many passages as there are filter elements. The shape and the dimensions of the passages are determined so as to receive the (cylindrical or conical) skirt of the gasket, thus avoiding any contact between the filter element and the metal of the head plate. The top portion of the gasket is received in spot facing formed in the backing plate, with the depth of the spot facing being less than the top portion of the gasket. Three main parameters contribute to making such individual gaskets: the shape of the skirt, the height of the top portion, and the Shore hardness of the gasket. Together these three parameters serve firstly to define an amount of flattening, on which sealing depends, and secondly to define the protection for the portion of the filter elements that passes through the head plate.

Whatever the type of gasket, single or individual, gaskets are made by plastics fabrication operations that require the fabrication of injection molds that are expensive and for which amortization contributes significantly to the cost price of a gasket.

Since the inside volume of a separator element is defined and limited by its outside dimensions and since the area of the filter surface is proportional to the number of channels, it has been found that the areas of the filter surfaces of filter membranes come up against a ceiling and, as a result, present performance that is limited in terms of flow rate.

Historically and in chronological order, single-channel cylindrical tubular separator elements were the first to appear on the market, followed by multichannel tubular separator elements.

In addition to increasing the total area of the filter surface, one of the advantages of multichannel separator elements lies in obtaining channels of small hydraulic diameter without any risk of fragility for the separator elements, however the initial multichannel separator elements had channels that were exclusively of circular right section.

The following generation abandoned circular channels in order to occupy the inside volume of the tube more completely and increase its filter surface area, thereby having the consequence of increasing compactness within casings (where compactness is expressed in square meters per cubic meter ($m^2/m^3$)), and also increasing possibilities for turbulence; with such compactness, expressed in $m^2/m^3$, corresponding to the ratio of the total area of the filter surfaces of the filter elements divided by the internal volume of the casing in which they are installed.

For a casing of given inside diameter and for separator elements possessing a given filter surface area, it is known that the compactness of the casings in which single-channel and multichannel separator elements are installed is limited by the distance D between each of the separator elements, which distance depends on the thickness of the gaskets used and on mechanical strength requirements for the head plates.

Furthermore, regardless of the type of gasket, i.e. single or individual, the skirt covering the outside portion of the filter element and providing sealing between the metal and the filter element is extended by a common plate for a single gasket or by an individual plate for an individual gasket. The thickness of this skirt and of the web between two passages define this distance D on which the number of filter elements inside the casing depends directly. This web is defined so as to provide the casing with mechanical strength, such as for example the ability to withstand an inside pressure of 10 bars.

By way of example, the table below gives the number of separator elements and the number of individual gaskets for three industrial casings.

|  | Prior art industrial configuration | | |
| --- | --- | --- | --- |
|  | DN100 | DN200 | DN350 |
| Inside diameter of the casing | 110 mm | 213 mm | 349 mm |
| Number of filter elements in the casing | 7 | 37 | 99 |
| Number of individual specific gaskets | 14 | 74 | 198 |

Also known from patent application US 2004/0076874 is a separator module having a series of porous columns supported at one of their ends by an inlet plate and at their other end by an outlet plate. The porous columns are fastened to the inlet and outlet plates, e.g. by sintering. One of the drawbacks of such a module lies with the difficulty of making such an assembly when the values for the outside diameter and for the thickness of the porous columns are very small. Specifically, the brittleness of ceramics together with the small dimensions of the columns mean that they are very fragile, which industrially speaking puts considerable limits on making a separator module having a large number of such columns. Still under such conditions of small outside diameter and small thickness, another drawback appears in the difficulty of controlling the distance between columns when the value of this distance is very small. By way of example, it is not possible to envisage making a separator module having several hundreds of porous columns of hydraulic diameter Dh=1.6 millimeters (mm), of thickness=0.9 mm, and with a distance between columns of 0.5 mm, without a single one of the columns breaking, which would make the separator module unusable.

One solution consists in making assemblies in which the number is limited to a few tens, but it is then necessary to assemble together the resulting mini-modules in order to obtain a separator module having an equivalent filter surface area. Unfortunately, assembling such mini-modules together leads to a major loss of volume because of the space between the mini-modules, thereby reducing the compactness of the assembly.

The present invention seeks to remedy the drawbacks of the prior art by proposing a novel single-piece separator element for obtaining molecular and/or particulate separation by tangentially filtering a fluid medium, and designed to improve compactness, i.e. the ratio of the filter surface area divided by the total inside volume of the casing (which ratio is expressed in $m^2/m^3$), the novel element also serving to simplify the modules by reducing the number of gaskets needed and by eliminating the need to have head plates.

With such a single-piece element in accordance with the invention, the compactness in the casings, expressed in $m^2/m^3$, is increased, for given hydraulic diameter, by a factor of at least 1.2, and preferably greater than 1.5, compared with the prior art and using conventional single-channel and multichannel separator elements.

To achieve such compactnesses, the invention provides a separator element for obtaining molecular and/or particulate separation of a fluid medium for treatment into a filtrate and a retentate, the element comprising a structure of at least two porous rigid columns made of the same material, positioned side by side to define outside their outside walls a volume for recovering the filtrate, each column presenting internally at least one open structure for passing a flow of the fluid medium, opening out in one of the ends of the porous column for inlet of the fluid medium for treatment and in the other end for outlet of the retentate, the element being characterized in that said porous columns are secured to one another at their ends by means of an inlet plate and an outlet plate, said plates not being separate parts fitted on the porous columns in order to form together said single-piece structure.

Thus, since the subject matter of the invention is to propose a separator module using a single-piece separator element in accordance with the invention by optimizing the distance between the porous columns and the thickness of the material of the porous columns, it is possible to obtain increased compactness expressed in $m^2/m^3$, for given hydraulic diameter, compared with prior art single-channel and multichannel separator elements.

The single-piece separator element of the invention also includes in combination one and/or more of the following additional characteristics:
- the porous rigid columns possess outside shapes that are constant or that vary along their length;
- the porous rigid columns possess transverse dimensions that are constant or that vary along their length;
- the plates are made out of the same material as the porous columns so as to have identity and continuity of material and of porous texture between the plates and the columns;

each plate has an outside face that is sealed and in contact with the fluid medium for treatment or with the retentate;

the plates possess a right section that is circular;

the plates possess a right section that is non-circular;

the porous columns are secured to one another via at least one connection bridge made of the same material as the plates and the columns;

the porous columns are of shapes that are different or identical;

the porous columns possesses transverse dimensions that are identical or different;

the porous columns are cylindrical in shape;

the porous columns are helical in shape;

the porous columns are intertwined;

the porous columns possess internal open structures for passing a flow of the fluid medium, which structures are identical for all of the porous columns or different for at least one of the porous columns;

each porous column includes a single channel as its open structure;

the channels of the porous columns for each porous column define a constant thickness of porous material lying in the range 0.25 mm to 5 mm, while the distance between the porous columns lies in the range 0.125 mm to 10 mm;

each porous column includes as its open structure channels all having a peripheral wall facing the outside wall of the porous column;

at least one separator layer for the fluid medium is deposited continuously on the surface of the open structure that comes into contact with the fluid medium;

the porous columns and the plates are made of organic material;

the porous columns and the plates are made of a ceramic selected from oxides, nitrides, carbides, or other ceramic materials, and mixtures thereof, and in particular from titanium oxide, alumina, zirconia, and mixtures thereof, titanium nitride, aluminum nitride, boron nitride, and silicon carbide, possibly mixed with some other ceramic material;

the porous columns and the plates are made of a non-metallic inorganic material; and the porous columns and the plates are made of a pure metal such as aluminum, zinc, copper, or titanium, or in the form of an alloy of a plurality of these metals, or of stainless steel.

The invention also proposes a separator module for obtaining molecular and/or particulate separation of a fluid medium for treatment into a filtrate and a retentate, the device comprising a casing containing at least one single-piece element in accordance with the invention in which each plate is mounted in a sealing gasket.

Various other characteristics appear from the following description made with reference to the accompanying drawings, which show embodiments of the subject matter of the invention as non-limiting examples.

FIGS. 5A to 5F are graphs showing compactness (plotted up the ordinate axis in $m^2/m^3$) as obtained with the separator elements in accordance with the invention when mounted in a DN 200 casing, as a function of the distance $\underline{d}$ (plotted along the abscissa axis in mm) between the porous columns, each of which has a single channel of hydraulic diameter Dh, for two values of thickness $\underline{e}$ (e=0.8 mm and e=1 mm), the hydraulic diameters being equal respectively to 6 mm, 6 mm, 4.6 mm, 3.5 mm, 2.3 mm, and 1.6 mm.

Figure 6A:
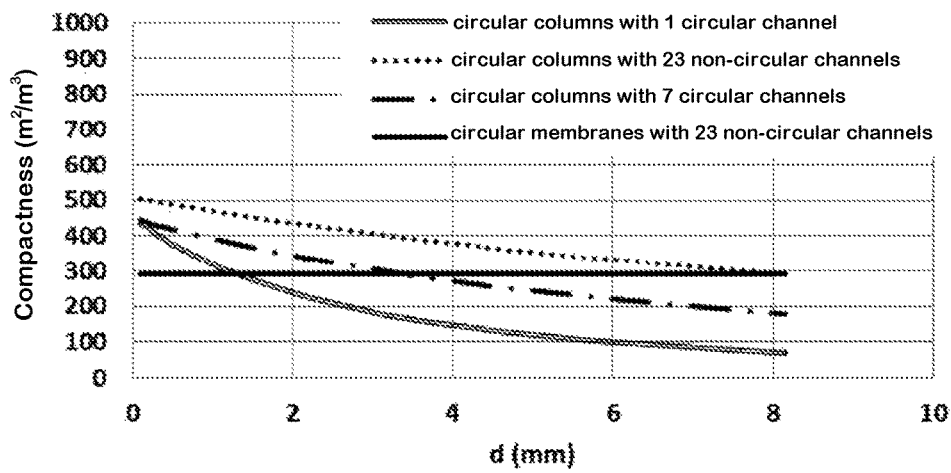
Figure 6B:
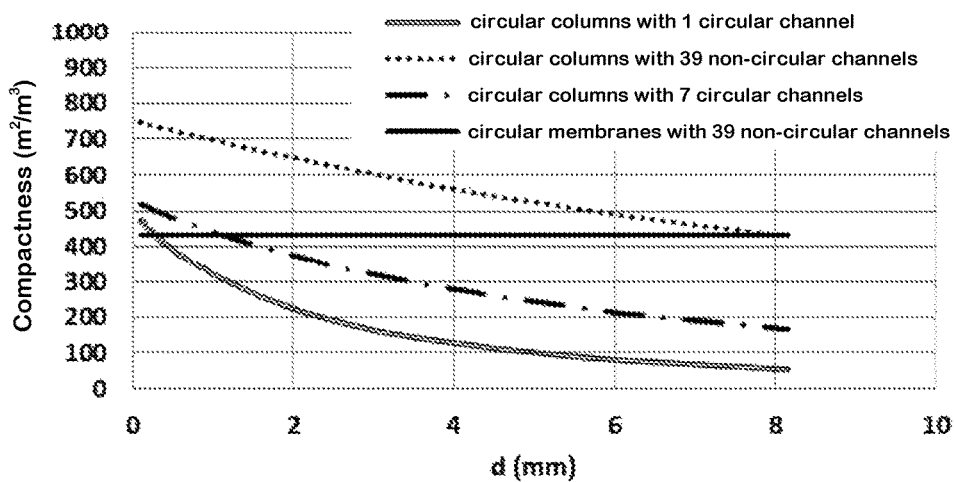
Figure 6C:
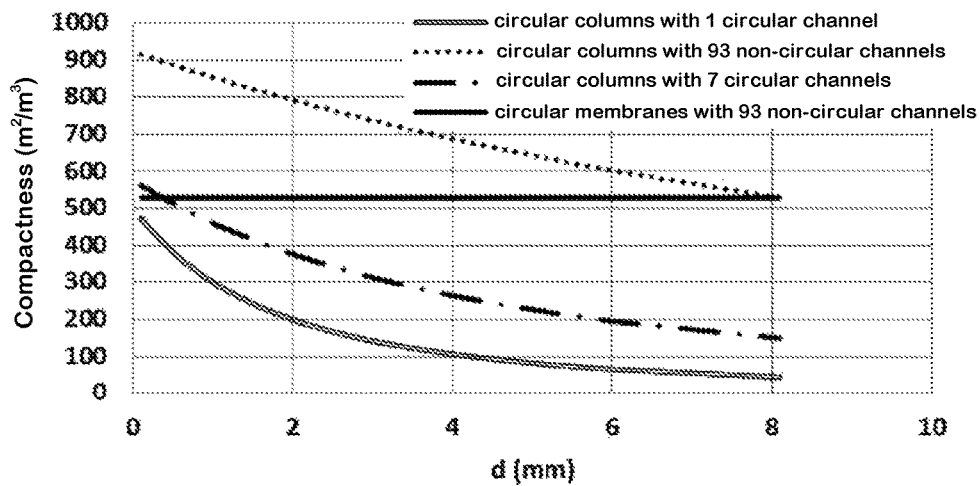

FIGS. 6A to 6C show compactness (plotted up the ordinate axis in $m^2/m^3$) obtained with separator elements in accordance with the invention mounted in a DN 200 casing as a function of the distance $\underline{d}$ (plotted along the abscissa axis in mm) between the porous columns that are provided with a single channel or with a plurality of channels in comparison with a prior art industrial configuration of equivalent hydraulic diameter taken as a reference (horizontal line), the hydraulic diameters being equal respectively to 3.47 mm, 2.3 mm, and 1.6 mm.

FIGS. 7A to 7E show compactness (plotted up the ordinate axis in $m^2/m^3$) obtained for separator elements in accordance with the invention mounted in DN 100 and DN 350 casings, as a function of the distance $\underline{d}$ (plotted up the abscissa axis in mm) between porous columns provided respectively with one channel, seven, 23, 29, and 93 channels, and respectively for hydraulic diameters equal to 6 mm, 6 mm, 3.5 mm, 2.5 mm, and 1.6 mm.

As a preliminary point, definitions are given of some of the terms used in the context of the invention.

The term "mean pore diameter" is used to mean the d50 value of a volume distribution at which 50% of the total volume of the pores corresponds to the volume of pores having a diameter less than this d50. The volume distribution is the curve (analytic function) representing the frequencies of pore volumes as a function of their diameters. d50 corresponds to the median separating into two equal portions the area situated under the curve of frequencies as obtained by mercury penetration for mean pore diameters greater than or equal to 4 nanometers (nm), or as obtained by adsorbing gas, in particular $N_2$, when the mean pore diameters are less than 4 nm, these two techniques being retained as references in the context of the invention for measuring mean pore diameters.

In particular, it is possible to use the techniques described in:

ISO standard 15901-1:2005 for the measurement technique using mercury penetration; and ISO standards 15901-2:2006 and ISO 15901-3:2007 for the measurement technique using gas adsorption.

The invention provides separator elements for obtaining molecular and/or particulate separation of a fluid medium by tangential filtering, which elements are commonly referred to as filter membranes. In general manner, and as shown in the figures, such a separator element 1 comprises a monolithic or single-piece rigid structure 2.

In the context of the invention, a single-piece structure is defined as being made of a single piece that is uniform and continuous throughout, having no bonds nor any exogenous additions. In other words, no component portion of the single-piece structure is a separate fitting, i.e. the single-piece structure is fabricated in a single operation such that the single-piece structure can be used directly for depositing separator layers or requires no more than single heat treatment.

In accordance with the invention, the single-piece structure 2 comprises at least two porous rigid columns 3 made of the same porous material (there being three columns in the example shown in FIG. 1) which columns are placed beside one another in order to define a peripheral space 4 for recovering filtrate located outside their outer walls. Each porous column 3 forms a rigid porous substrate presenting a generally elongate shape extending from a first end $3_1$ to a second end $3_2$ opposite from the first end.

Each porous column 3 includes internally at least one open structure 5 for passing a flow of the fluid medium for treatment, opening out at the first end $3_1$ of the porous column for inlet of the fluid medium for treatment and at the second end $3_2$ of the porous column for outlet of the retentate. The open structure 5, which in the example shown is in the form of a channel, corresponds to an empty space for passing the flow of the fluid medium, i.e. a zone of the porous column 3 that does not contain porous material.

The portion of each porous column 3 defining the open structure or channel 5 presents a surface that is covered by at least one separator layer C that is to come into contact with the fluid medium for treatment that flows inside the open structure 5. A portion of the fluid medium passes through the separator layer C and the porous material of the porous column 3 such that this treated portion of the fluid, referred to as filtrate or permeate, flows through out through the outer wall 3a of each porous column. The filtrate is recovered in the peripheral space 4 of the porous structure by any appropriate means. Each porous column 3 thus possesses a peripheral wall of thickness $\underline{e}$ between the open structure 5 and its outer wall 3a.

In accordance with the invention, the porous columns 3 are secured to one another at least at their neighboring first ends by means of an inlet plate 7, and at their neighboring second ends by means of an outlet plate 8. Each plate 7, 8 provides a mechanical assembly connection between the porous columns 3, with the inlet plate 7 providing the connection between the porous rigid columns at their first ends $3_1$ and with the outlet plate 8 providing the connection between the porous rigid columns at their second ends $3_2$. In accordance with the invention, the plates 7, 8 are not separate parts fitted onto the porous columns, i.e. together they form said single-piece structure. Specifically, the porous columns 3 and the plates 7, 8 are fabricated in a single operation such that the resulting single-piece structure 2 is directly usable for depositing separator layers C for the fluid medium for treatment or requires no more than single heat treatment.

Each plate 7, 8 possesses a respective inside face $7_1$, $8_1$ facing towards and in contact with the peripheral space 4 of the porous structure, and a respective outside face $7_2$ facing towards and in contact with the fluid medium for treatment, or $8_2$ facing towards and in contact with the retentate. The inlet and outlet plates 7, 8, which possess respective perimeters $7_3$, $8_3$ of thickness that varies as a function of the desired mechanical strength, present a right section appropriate for enabling them to be mounted in a casing, as can be better understood from the description below. In the example shown in the drawings, the plates 7, 8 possesses a right section that is circular, however it is clear that the right section of these plates could be different, i.e. non-circular.

In accordance with a characteristic of the invention, the porous columns 3 are also secured to one another by means of at least one connection bridge 9 serving to stiffen the porous columns 3 together, while ensuring that a constant spacing is conserved between the porous columns 3. Thus, the porous columns 3 are spaced apart from one another by a distance $\underline{d}$. These connection bridges 9 are made locally with any appropriate shape, being distributed preferably regularly between the plates. These connection bridges 9 are made of the same material as the porous columns.

The porous columns 3, the inlet and outlet plates 7 and 8, and the connection bridges 9 together form a single-piece structure. Such single-piece structures 2 that cannot be made by conventional extrusion techniques can be made preferably by additive techniques such as that described by way of example in patent application FR 3 006 606. In an additive method of fabrication, it is considered that the plates and columns are said not to be separate parts fitted to one another if fabrication enables the plates 7, 8 and the porous columns 3 to be shaped in such a manner that the resulting single-piece structure 2 can be used directly for depositing layers or requires no more than single heat treatment. In an additive fabrication method, the entire single-piece structure is constructed by superposing mutually connected elementary layers by projecting a liquid in fine droplets or by supplying energy, with first consolidation heat treatment being essential when using the first method; while with the second method the interaction between energy and material is normally sufficient to lead either to sintering or else to melting and/or solidification of the material.

Heat treatment is essential particularly when the localized delivery of liquid is performed using microdroplets created with a piezoelectric element, which droplets are possibly charged and directed in an electrostatic field; the liquid is a binder or an agent for activating binder that has previously been added to the ceramic powder.

Such single-piece structures 2 may also be made for example by the casting technique, which requires operations of making a mold, of preparing a suspension for casting, of casting proper, of drying, of unmolding, and of heat treatment to obtain the porosity and the strength of the single-piece structure.

For such single-piece structures 2, the porous columns 3 present a porous texture that is continuous throughout the volume of the porous columns. This porous texture is characterized by the mean diameter of the pores as deduced from their distribution as measured by mercury penetration porometry.

The porous texture of the porous columns 3 is open and forms a network of interconnected pores, thus enabling the fluid that has filtered through the filter separator layer to pass through the porous structure and be recovered by the peripheral space 4 of the porous structure. It is common practice to measure the permeability to water of the porous structure in order to qualify the hydraulic resistance of the porous structure, which simultaneously makes it possible to confirm that the porous texture is interconnected. Specifically, in a porous medium, the steady flow of an incompressible viscous fluid is governed by Darcy's law. The speed of the fluid is proportional to the pressure gradient and inversely proportional to the dynamic viscosity of the fluid, via a characteristic parameter known as "permeability" that may be measured, for example, in compliance with French standard NF X 45-101, of December 1996.

Usually, the porous columns 3 are made of a non-metallic inorganic material. Preferably, the porous columns 3 are made of a ceramic, selected from among oxides, nitrides, carbides, and other ceramic materials, and mixtures thereof, and in particular from titanium oxide, alumina, zirconia, and mixtures thereof, titanium nitride, aluminum nitride, boron nitride, and silicon carbide, possibly mixed with some other ceramic material.

It should be observed that the porous structure may also be made out of an organic material or out of an inorganic material that is purely metallic. For example, the porous columns 3 may be made of a pure metal such as aluminum, zinc, copper, or titanium or in the form of an alloy of a plurality of these metals, or of stainless steels.

For example, the material constituting the porous columns 3 may present a mean pore diameter lying in the range 1 micrometer (µm) to 100 µm. The porous columns 3 and the plates 7, 8 are made out of the same material with identity and continuity of material and porous texture between the plates and the porous columns 3. The porosity of the material constituting the porous columns 3 and the plates 7, 8 is identical.

According to an advantageous embodiment characteristic of the invention, each plate 7, 8 is made in the form of a solid element so as to form a solid plate of section covering all of the sections of the porous columns 3. The plates 7, 8 thus close the peripheral space 4 of the porous structure, thereby confining the filtrate. Each plate 7, 8 has an outside face $7_2$, $8_2$ in contact respectively with the fluid medium for treatment and with the retentate, these outside faces $7_2$, $8_2$ being sealed so as to avoid the fluid medium for treatment and the retentate penetrating into the plates. The outside faces $7_2$, $8_2$ of the plates 7, 8 may be sealed in any appropriate manner. For example, the outside faces $7_2$, $8_2$ of the plates 7, 8 may be sealed by densification up to a value equal or very close to the intrinsic density of the material or by impregnation or by depositing an additional material other than the material of the plate.

Figure 3:
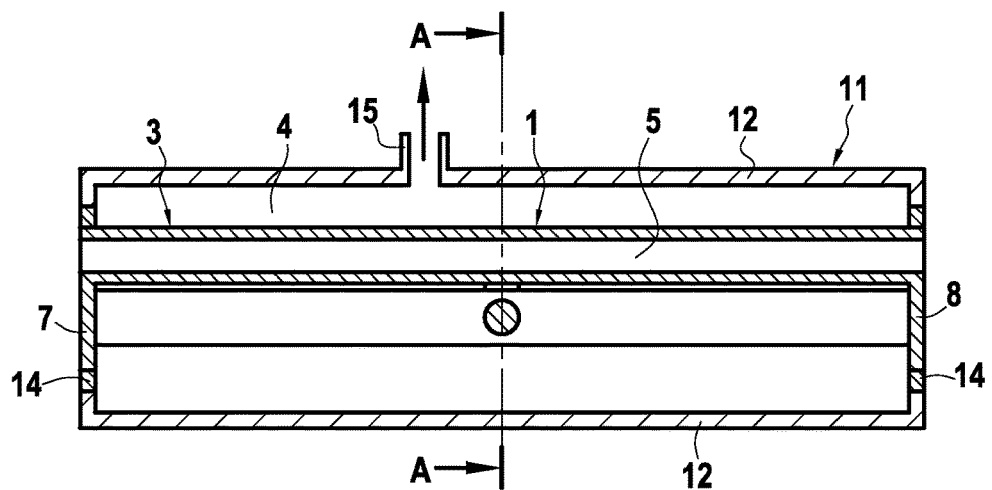
FIG. 3 is a section view in elevation showing the principle of mounting a separator element in accordance with the invention of the kind shown in FIG. 1 inside a casing.
Figure 3A:
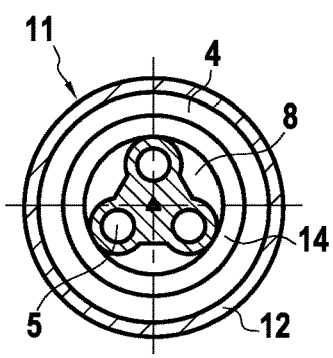
FIG. 3A is a cross-section view on line A-A of FIG. 3.

Thus, as can be seen more precisely in FIGS. 3 and 3A, the separator element 1 in accordance with the invention is for use in a separator module 11 of any known type. In conventional manner, the separator module 11 comprises a casing 12 of tubular shape in which one or more separator elements 1 are mounted.

For this purpose, the separator module 11 is mounted so that the inlet and outlet plates 7 and 8 are located at the ends of the casing 12. These inlet and outlet plates 7 and 8 are mounted in sealed manner to the casing 12 via sealing gaskets 14. These sealing gaskets 14 are mounted in any appropriate manner on the casing, either directly at the ends of the casing or else in holes formed in separate support plates that are fastened to the ends of the casing. The porous columns 3 are thus positioned inside the casing 12, which is closed by the plates 7, 8 and by the sealing gasket 14 optionally associated with the support plates. The casing 12 thus co-operates with the outside walls 3a of the porous columns 3 and the inside faces $7_1$, $8_1$ of the plates to define the peripheral space 4 for recovering the filtrate. The filtrate as confined in this way in the casing 12 is removed by any appropriate means, via an outlet 15 provided in the casing 12.

In the example shown in FIGS. 3 and 3A, the separator device 11 comprises a single separator element 1 having a number of porous columns 3 that is selected to obtain the desired filter surface area. Naturally, the separator device 11 may have a plurality of separator elements 1 in accordance with the invention. Under such circumstances, each separator element 1 is mounted in sealed manner in the casing 12 by using plates 7, 8 provided with sealing gaskets 14.

Figure 1:
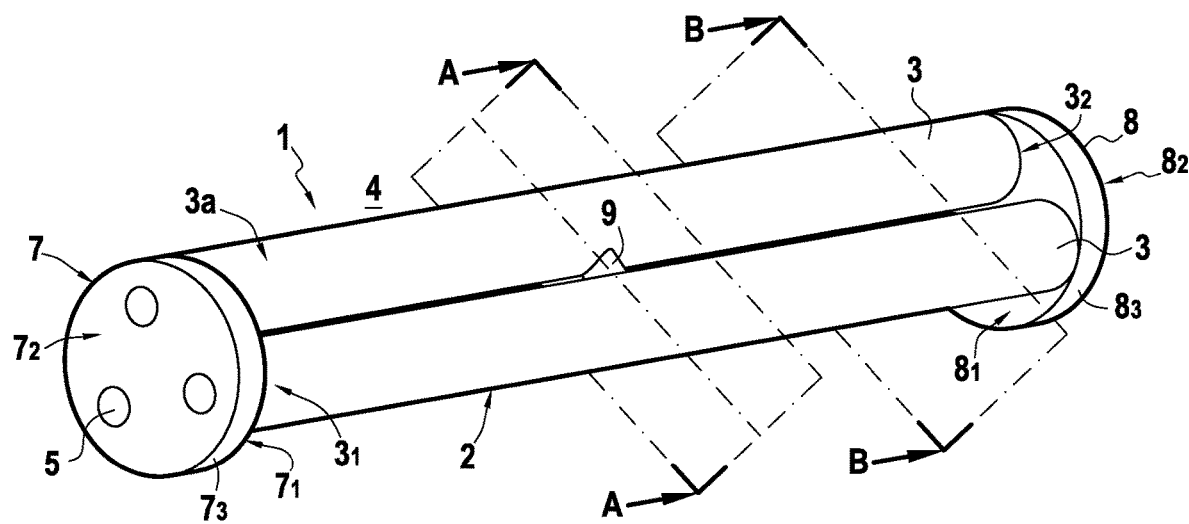
FIG. 1 is a perspective view of a first embodiment of a separator element in accordance with the invention.
Figure 1A:
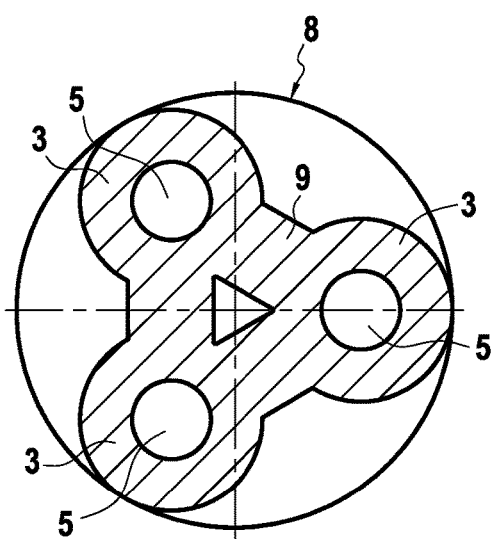
FIGS. 1A and 1B are cross-section views taken respectively on lines A-A and B-B of the separator element shown in FIG. 1.
Figure 1B:
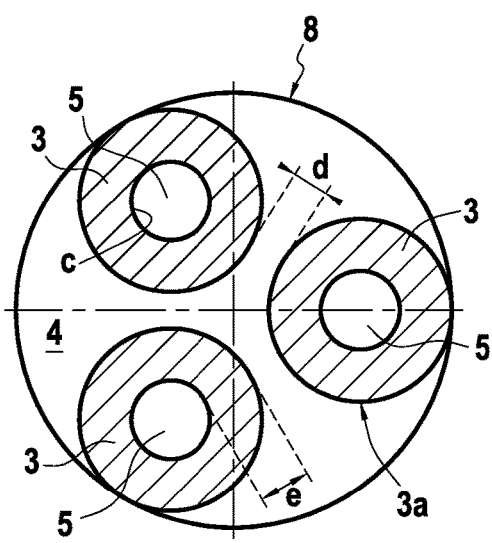

As can be seen from the above description, the fluid medium enters and leaves respectively via the inlet plate 7 and the outlet plate 8 of the single-piece structure 2 through separate openings forming the open structure 5 that has three channels in the example shown in FIG. 1.

The separator filter layer C that covers the walls of each of the channels 5 serves to filter the fluid medium for treatment. By definition, the separator filter layers C need to have a mean pore diameter that is less than the mean pore diameter of the porous columns 2. The separator layers define the surface of the tangential flow separator element that is to be in contact with the fluid for treatment and over which the fluid for treatment flows.

A prior art tangential flow separator element generally presents a length in the range 1 meter (m) to 1.5 m. The section of a tangential flow separator element usually presents an area lying in the range 0.8 square centimeters ($cm^2$) to 14 $cm^2$.

In the context of the present invention, the single-piece columnar-structure separator elements present a length of several centimeters to several meters, preferably lying in the range 5 cm to 5 m.

The section of a single-piece columnar-structure separator element depends on the number of columns and on the distance between the columns, and it may lie in the range a few centimeters to a few meters.

The thicknesses of the separator filter layers typically lie in the range 1 µm to 100 µm.

Naturally, in the context of the present invention, in order to perform its separator function, and act as an active layer, a separator layer presents a mean pore diameter that is less than the mean diameter of the pores of the porous column. Usually, the mean pore diameter of the separator filter layers is less than the mean pore diameter of the porous column by a factor of at least 3, and preferably by a factor of at least 5.

It should be observed that microfiltration, ultrafiltration, and nanofiltration separator layers are well known to the person skilled in the art. It is generally accepted that:
microfiltration separator layers present a mean pore diameter lying in the range 0.1 µm to 2 µm;
ultrafiltration separator layers present a mean pore diameter lying in the range 0.01 µm to 0.1 µm; and
nanofiltration separator layers present a mean pore diameter lying in the range 0.5 nm to 10 nm.

It is possible that the micro- or ultrafiltration layer is deposited directly on the porous column (a single-layer separator layer), or indeed on an intermediate layer of smaller mean pore diameter, itself deposited directly on the porous column. By way of example, the separator layer may be based on or constituted exclusively by one or more metallic oxides, carbides, or nitrides, or other ceramics. In particular, the separator layer could be based on or constituted exclusively by $TiO_2$, $Al_2O_3$, and $ZrO_2$, singly or in a mixture.

Figure 4:
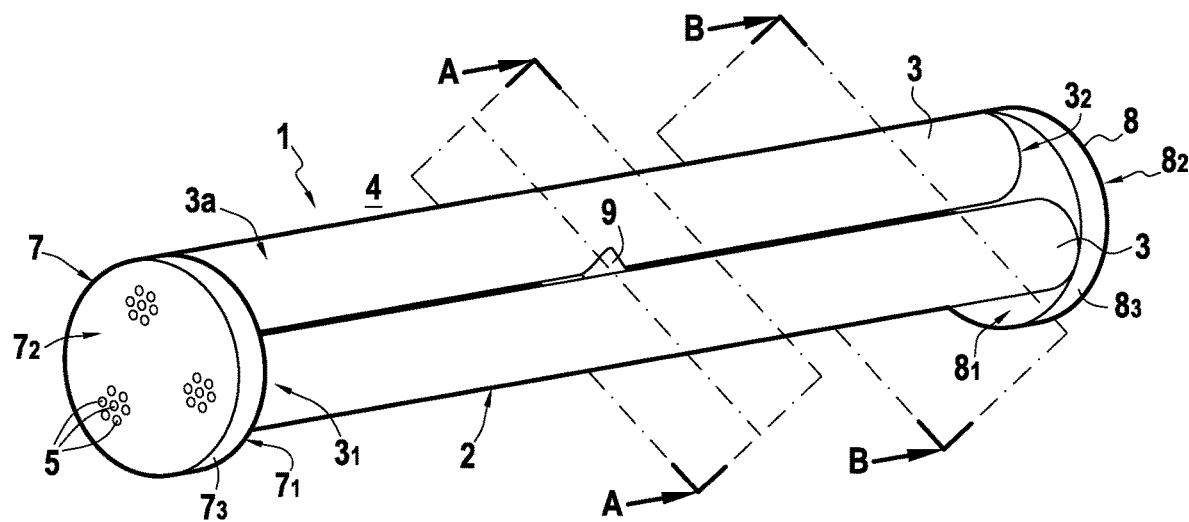
FIG. 4 is a perspective view of another embodiment of a separator element in accordance with the invention in which each porous column has seven channels.
Figure 4A:
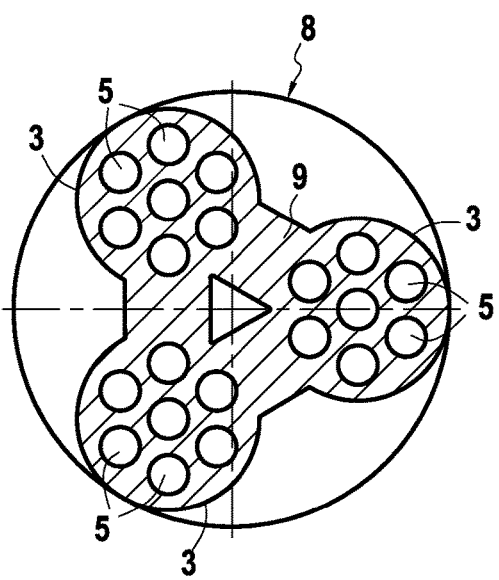
FIGS. 4A and 4B are cross-section views taken respectively on lines A-A and B-B of the separator element shown in FIG. 4.
Figure 4B:
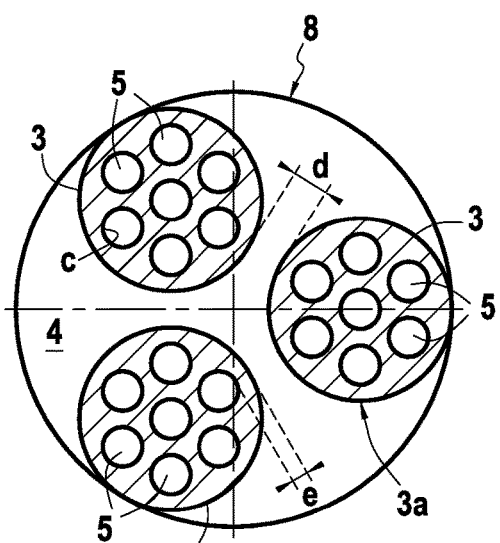
Figure 5A:
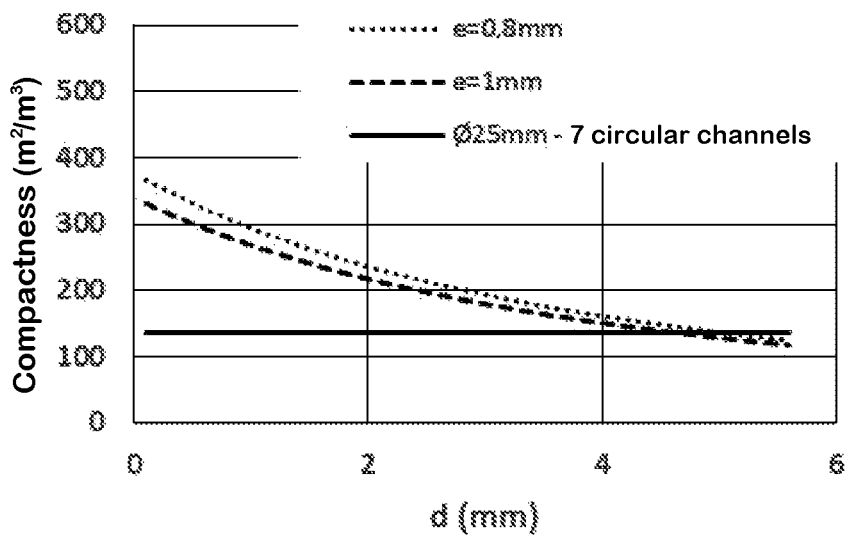
Figure 5B:
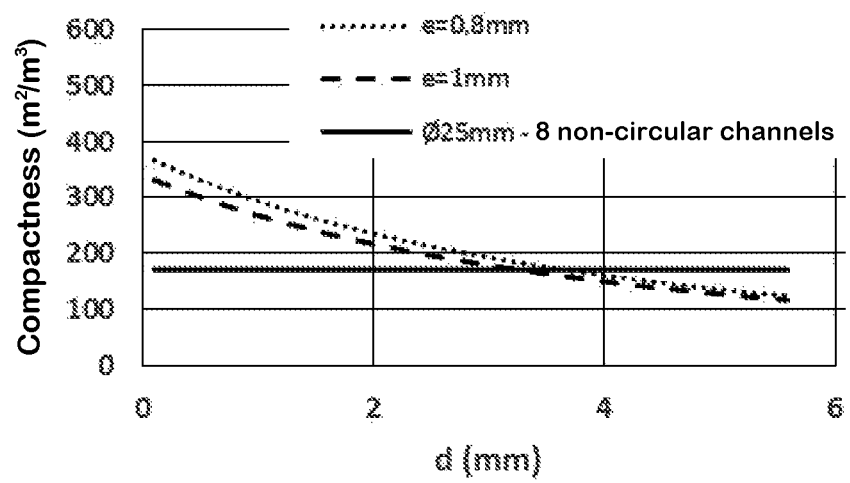
Figure 5C:
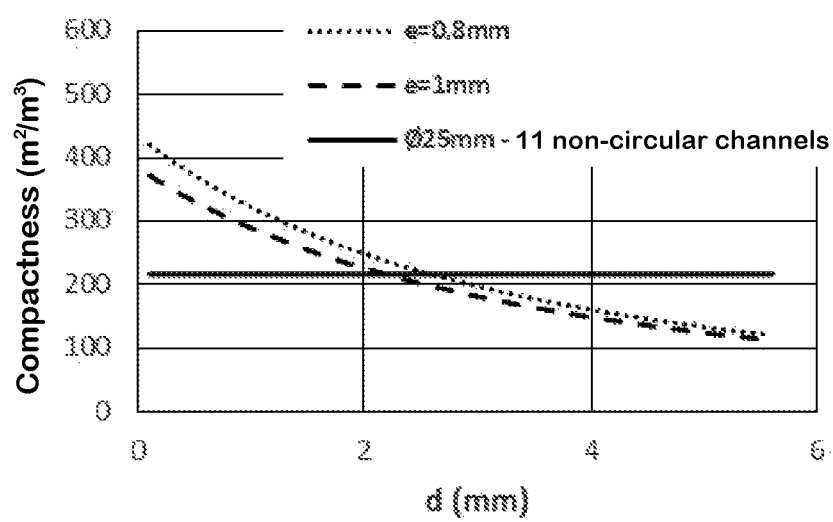
Figure 5D:
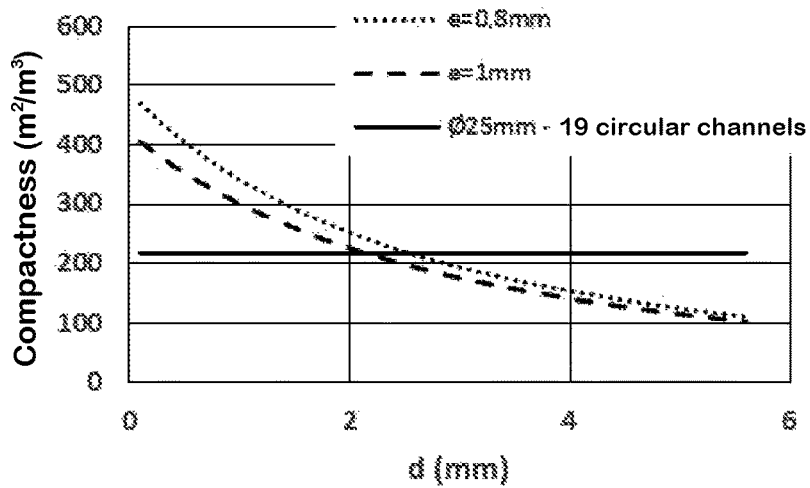
Figure 5E:
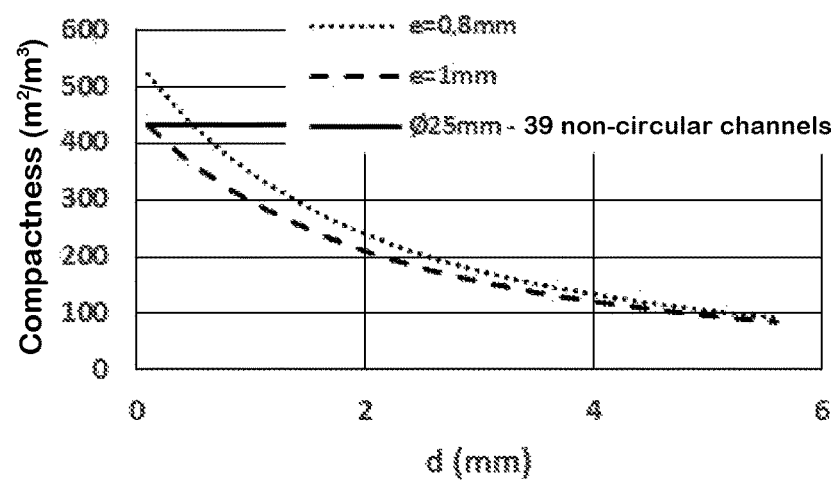
Figure 5F:
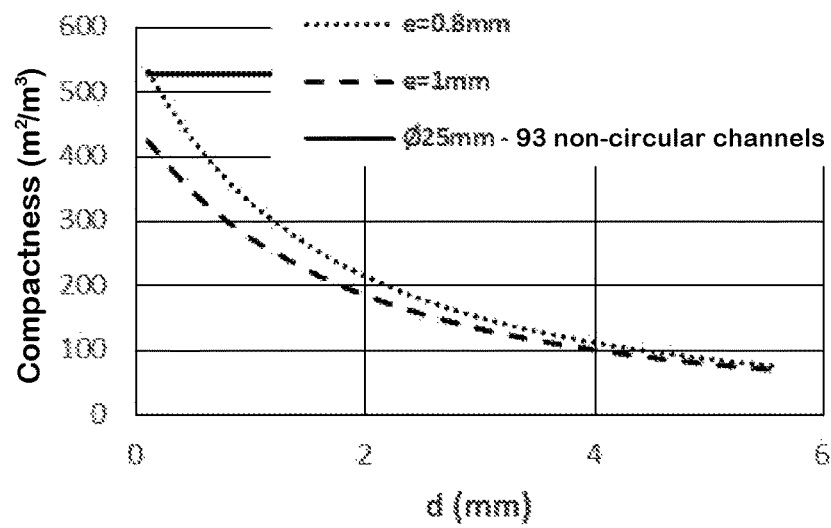

In the example shown in FIG. 1, each porous column 3 advantageously possesses a single channel. Naturally, it may be envisaged to make a plurality of channels in each porous column. When the porous support has a plurality of channels, mention may be made to arrange the channels 5 so as to create within each porous column at least two flow circuits for the fluid medium that are not mutually interconnected between the inlet and outlet ends of the porous column. In this embodiment, each channel 3 extends from the inlet to the outlet of the porous column without being connected to another channel. FIGS. 4, 4A, and 4B show such an embodiment in which each porous column 3 possesses seven channels 5 arranged independently of one another in the inlet plate 7 and going to the outlet plate 8. Naturally, the number of channels per porous column may be different from the example shown.

An advantage of the subject matter of the invention is to enable the compactness of separator elements to be improved once they have been mounted in a casing.

Table 1 below gives compactness in $m^2/m^3$ for various separator membranes mounted in a DN 200 cylindrical casing having an inside diameter of 213 mm. As shown in the table, the separator membranes are of sections that are either circular or else hexagonal, presenting a determined number of channels 5 of circular section or of non-circular section, and presenting a hydraulic diameter Dh.

TABLE 1

| section | circular | circular | hexagonal | circular | hexagonal | circular | circular | hexagonal | circular | circular |
|---|---|---|---|---|---|---|---|---|---|---|
| Dh | 1.6 | 2.3 | 3.47 | 3.5 | 4.6 | 3.0 | 6.0 | 6.0 | 4.0 | 6.0 |
| channels | 93 chan non-circular | 39 chan non-circular | 23 chan non-circular | 19 chan non-circular | 11 chan non-circular | 37 chan circular | 8 chan non-circular | 7 chan circular | 19 chan circular | 19 chan circular |
| m2/m3 | 528.57 | 431.67 | 290.71 | 216.71 | 215.83 | 185.88 | 171.79 | 136.55 | 127.31 | 120.44 |

Figure 7A:
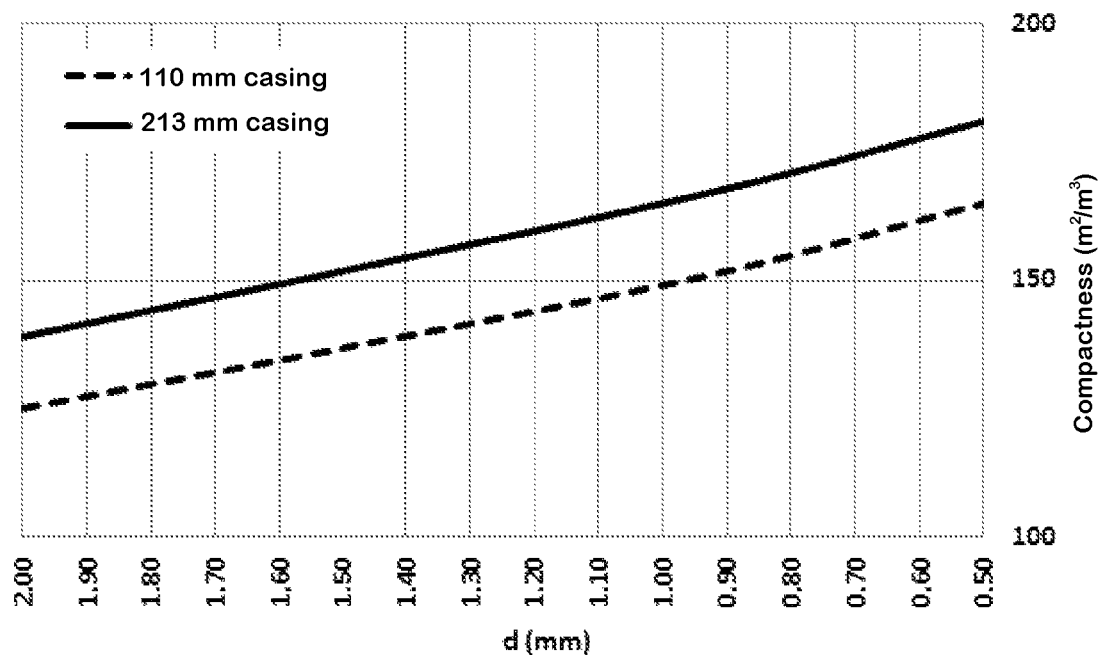

FIG. 7A shows compactness in $m^2/m^3$ as obtained for separator elements 1 in accordance with the invention having porous columns of circular section with a single central channel, all of which were identical with an outside diameter of 10 mm and a thickness e equal to 2 mm, the circular inside channel then having a hydraulic diameter Dh=6 mm, and the columns being mounted in DN 100 and DN 200 casings defined by the their inside diameters, each rigid structure 2 arranged in accordance with the description of the invention being terminated by end plates 7 and 8 connected to the casing via respective single sealing gaskets. These compactness values are given as a function of the distance d (plotted along the abscissa axis in mm, with decreasing values).

The 2 mm maximum distance d between columns corresponds to the distance that, in the prior art, lies between filter elements having an outside diameter of 10 mm when they are installed in such industrial casings.

As this value decreases, as is made possible by the separator element of the present invention, the compactness of the casings increases.

TABLE 2

| | Dh = 6 mm Inside diameter of the casing | |
|---|---|---|
| d | DN100 110 mm | DN200 213 mm |
| 2 mm | 125 $m^2/m^3$ | 139 $m^2/m^3$ |
| 0.5 mm | 165 $m^2/m^3$ | 181 $m^2/m^3$ |
| Increase in compactness | +32% | +30% |

This example applies to porous columns and channels that are of circular section, however the invention may be applied to columns of non-circular section and to channels of non-circular section.

FIGS. 5A to 5F are graphs, for respective different hydraulic diameters Dh, and each for two thickness values e (e=0.8 mm and e=1 mm) giving compactness (plotted up the ordinate axis in $m^2/m^3$) obtained with separator elements 1 in accordance with the invention mounted in a DN 200 casing, as a function of the distance d (plotted along the abscissa in mm) between the porous columns 3, each of which has a single channel of hydraulic diameter Dh. Compactness is compared with a reference compactness (horizontal line) for a prior art industrial configuration made up of multichannel membranes having an outside diameter of 25 mm, and with an equivalent hydraulic diameter.

When the porous columns possess only one channel, in comparison with prior art industrial configurations using multichannel circular membranes with an outside diameter of 25 mm and with equivalent hydraulic diameters, the separator elements of the invention make it possible to obtain compactnesses that are greater depending on the value of the distance d between the porous columns 3, with this applying up to a certain limit value for the hydraulic diameter Dh, which is close to 2.3 mm.

Table 3 below gives compactness in $m^2/m^3$ for separator elements 1 in accordance with the invention mounted in a DN 200 casing having an inside diameter of 213 mm with e=0.9 mm and d=0.5 mm for five different hydraulic diameters. The compactnesses are compared with compactnesses obtained in prior art industrial configurations.

TABLE 3

| Dh | 1.6 | 2.3 | 3.5 | 4.6 | 6 | 6 |
|---|---|---|---|---|---|---|
| Prior art industrial configuration | 93 cx 528 | 39 cx 431 | 23 cx 216 | 11 cx 216 | 8 cx 172 | 7 cx 136 |
| e = 0.9 mm d = 0.5 mm | 382 | Columns with only one channel 394 | 377 | 350 | 316 | 316 |
| improvement % | −27.7 | −8.7 | 74.0 | 62.2 | 83.9 | 131.4 |

For a hydraulic diameter Dh=2.3 mm or less, prior art industrial configurations give compactnesses that remain greater than separator elements of the invention.

This behavior can be explained by the fact that the thickness of the columns cannot be reduced excessively (it is assumed herein that the minimum thickness must reasonably lie in the range 0.8 mm to 1 mm).

FIGS. 6A to 6C show compactness (plotted up the ordinate in $m^2/m^3$) obtained with separator elements 1 in accordance with the invention mounted in a DN 200 casing, as a function of the distance d (plotted up the abscissa axis and in mm, with increasing values), between porous columns 3 having only one channel or a plurality of channels, and in comparison with a prior art industrial configuration of equivalent hydraulic diameter taken as a reference (horizontal line).

FIG. 6A serves to compare a separator element in accordance with the invention in which the porous columns 3 have a single circular channel with a hydraulic diameter of 3.47 mm (e=0.9 mm), firstly with a separator element in accordance with the invention for which each of the porous columns 3 is provided with seven circular channels of hydraulic diameter Dh=3.47 mm, and secondly with a separator element in accordance with the invention for which each of the porous columns is provided with twenty-three non-circular channels of hydraulic diameter Dh=3.47 mm.

It can be seen from the graph of FIG. 6A that the compactness obtained by the separator element 1 of the invention meets the compactness of the prior art industrial configuration for a spacing d̲ between the porous columns 3 that is of the order of 8.1 mm. Thus, for a separator element in which the porous columns are spaced apart by a distance d̲ equal to 0.5 mm, the resulting increase in compactness is 67%.

FIG. 6B serves to compare a separator element in accordance with the invention for which the porous columns 3 are provided with a single circular channel of hydraulic diameter 2.3 mm (e=0.9 mm), firstly with a separator element in accordance with the invention for which each of the porous columns 3 is provided with seven circular channels of hydraulic diameter Dh=2.3 mm, and secondly with a separator element in accordance with the invention for which each of the porous columns is provided with thirty-nine non-circular channels of hydraulic diameter Dh=2.3 mm.

It can be seen from the graph of FIG. 6B that the compactness obtained by the separator element 1 of the invention meets the compactness of the prior art industrial configuration for a spacing between the porous columns 3 that is of the order of 8.1 mm. Thus, for a separator element in which the porous columns are spaced apart by a distance d=0.5 mm, the resulting increase in compactness is 67%.

FIG. 6C serves to compare a separator element in accordance with the invention for which the porous columns 3 are provided with a single circular channel of hydraulic diameter 1.6 mm (e=0.9 mm), firstly with a separator element in accordance with the invention for which each of the columns is provided with seven circular channels of hydraulic diameter Dh=1.6 mm, and secondly with a separator element in accordance with the invention for which each of the columns is provided with ninety-three non-circular channels of hydraulic diameter Dh=1.6 mm.

It can be seen from the graph of FIG. 6C that the compactness obtained by the separator element 1 of the invention meets the compactness of the prior art industrial configuration for a spacing between the porous columns 3 that is of the order of 8.1 mm. Thus, for a separator element in which the porous columns are spaced apart by a distance d̲ equal to 0.5 mm, the resulting increase in compactness is 67%.

In general manner, when the porous columns possess more channels, in comparison with prior art industrial configurations using multichannel circular membranes with equivalent hydraulic diameters, the separator elements of the invention always enable compactnesses to be obtained that are greater, providing the distance d̲ is less than 8.1 mm.

Figure 7B:
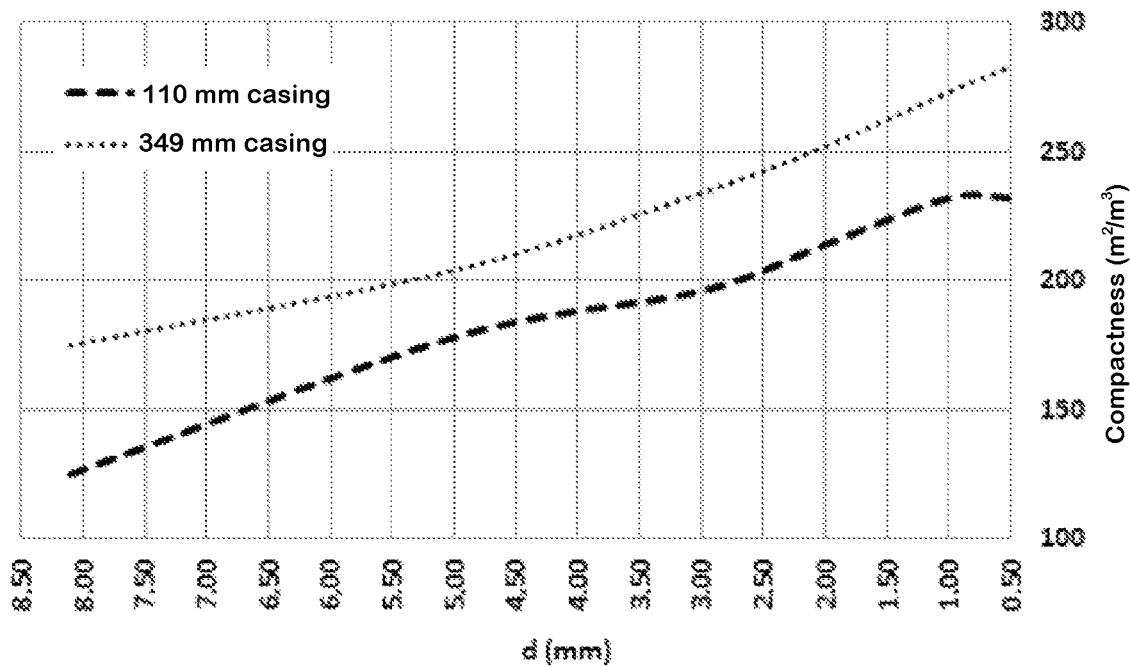

FIG. 7B gives compactness in $m^2/m^3$ for columnar-structure separator elements of the present invention having porous columns, each possessing a plurality of channels, the columns all being identical with an outside diameter of 25 mm, there being seven internal channels of hydraulic diameter Dh=6 mm mounted in DN 100 and DN 350 casings defined by their inside diameters, each rigid structure 2 arranged in accordance with the description of the invention terminating in end plates, which end plates are connected to the casing via respective single sealing gaskets.

The maximum distance d̲ between the porous columns of 8.1 mm corresponds to the distance that, in the prior art, lies between filter elements having an outside diameter of 25 mm when they are installed in such industrial casings.

When this distance decreases, as is made possible by a separator element of the present invention, the compactness of the casings increases.

TABLE 4

| | Dh = 6 mm Inside diameter of the casing | |
| --- | --- | --- |
| D | DN100 110 mm | DN350 349 mm |
| 8.1 mm | 125 $m^2/m^3$ | 175 $m^2/m^3$ |
| 0.5 mm | 232 $m^2/m^3$ | 283 $m^2/m^3$ |
| Improvement in compactness | +85% | +62% |

This example shows the situation of porous columns and channels of circular section, however the invention may be applied to columns of non-circular section and to channels of non-circular section.

Figure 7C:
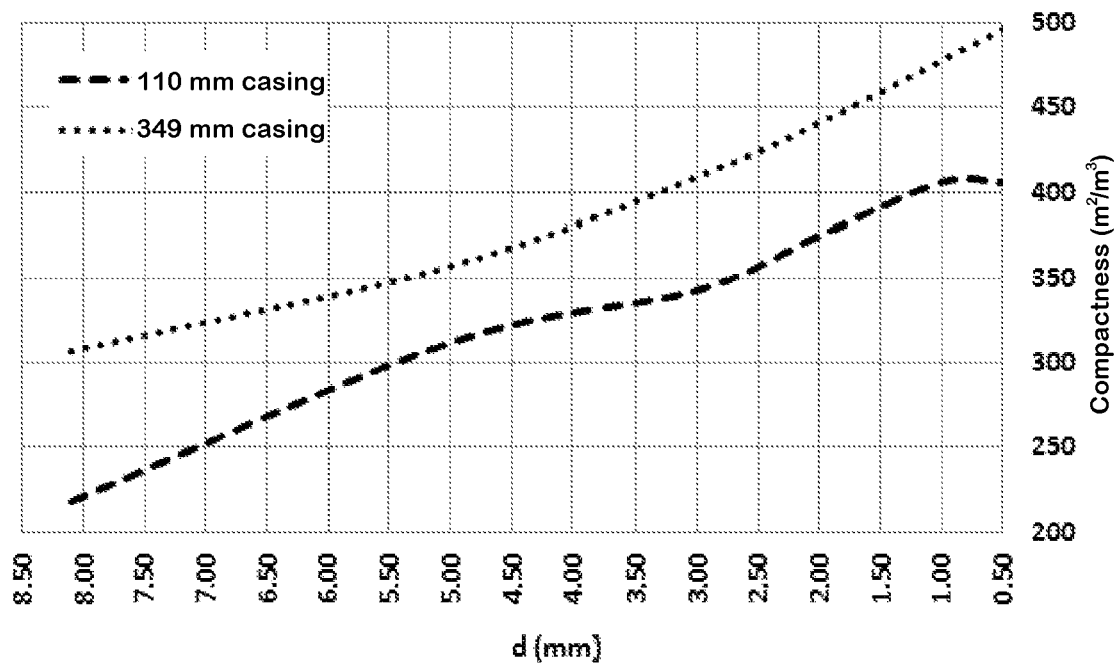

FIG. 7C gives the compactness in $m^2/m^3$ for columnar-structure separator elements of the present invention having circular section porous columns, each possessing a plurality of channels of non-circular section, the columns all being identical with an outside diameter of 25 mm, there being twenty-three internal channels of hydraulic diameter Dh=3.5 mm mounted in DN 100 and DN 350 casings defined by their inside diameters, each rigid structure arranged in accordance with the description of the invention terminating in end plates, which end plates are connected to the casing via respective single sealing gaskets.

The maximum distance d̲ between the porous columns of 8.1 mm corresponds to the distance that, in the prior art, lies between filter elements having an outside diameter of 25 mm when they are installed in such industrial casings.

When this distance decreases, as is made possible by a separator element of the present invention, the compactness of the casings increases.

TABLE 5

| | Dh = 3.5 mm Inside diameter of the casing | |
| --- | --- | --- |
| d | DN100 110 mm | DN350 349 mm |
| 8.1 mm | 218 $m^2/m^3$ | 307 $m^2/m^3$ |
| 0.5 mm | 406 $m^2/m^3$ | 496 $m^2/m^3$ |
| Improvement in compactness | +86% | +62% |

This example shows the situation of columns that are circular in section, however the invention may be applied to columns that are of non-circular section.

Figure 7D:
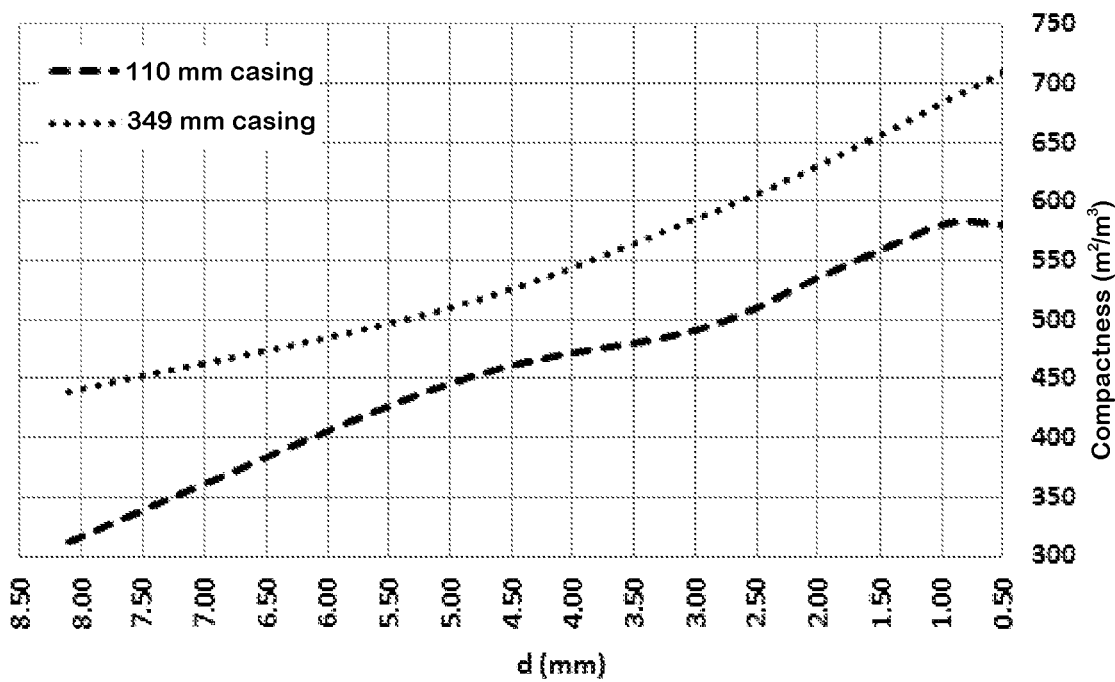

FIG. 7D gives the compactness in $m^2/m^3$ for columnar-structure separator elements of the present invention having circular section porous columns each possessing a plurality of channels of non-circular section, the columns all being identical with an outside diameter of 25 mm, there being thirty-nine internal channels of hydraulic diameter Dh=2.5 mm mounted in DN 100 and DN 350 casings defined by their inside diameters, each rigid structure arranged in accordance with the description of the invention terminating in end plates, which end plates are connected to the casing via respective single sealing gaskets.

The maximum distance d between the porous columns of 8.1 mm corresponds to the distance that, in the prior art, lies between filter elements having an outside diameter of 25 mm when they are installed in such industrial casings.

When this distance decreases, as is made possible by the separator element of the present invention, the compactness of the casings increases.

TABLE 6

|   | Dh = 2.5 mm Inside diameter of the casing | |
|---|---|---|
| D | DN100 110 mm | DN350 349 mm |
| 8.1 mm | 312 m²/m³ | 439 m²/m³ |
| 0.5 mm | 580 m²/m³ | 709 m²/m³ |
| Improvement in compactness | +86% | +62% |

This example illustrates the situation of columns that are circular in section, however the invention may be applied to columns that are of non-circular section.

Figure 7E:
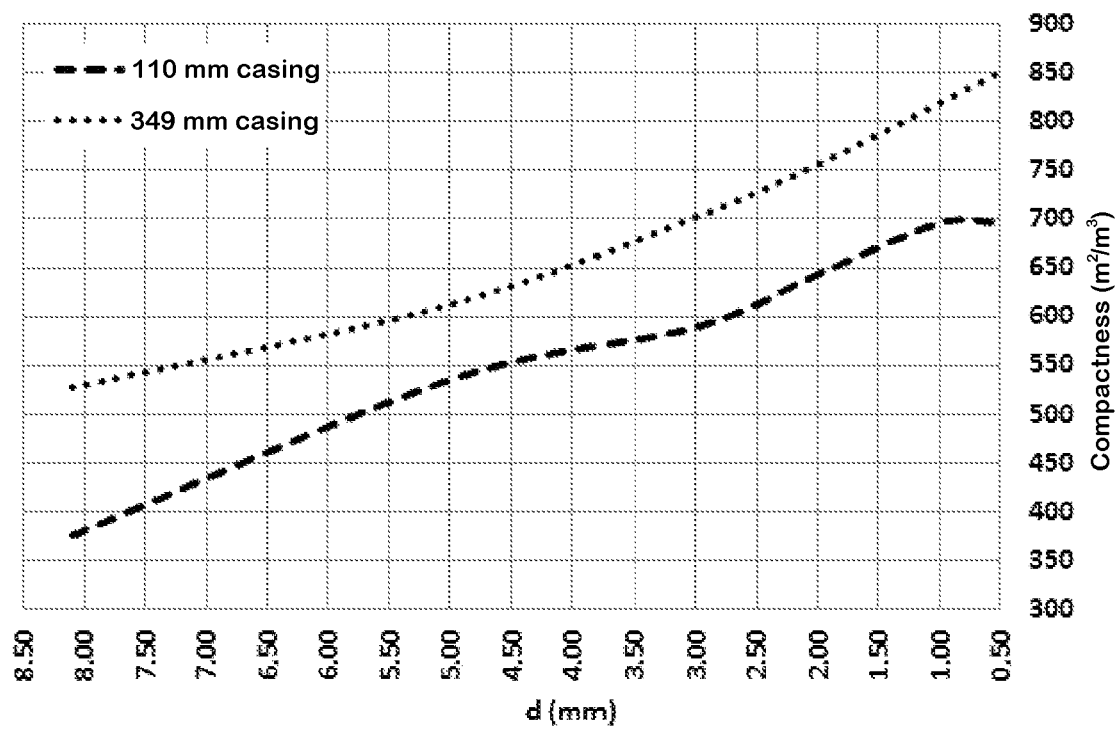

FIG. 7E gives the compactness in $m^2/m^3$ for columnar-structure separator elements of the present invention comprising porous columns of circular section possessing a plurality of channels of non-circular section, the columns all being identical and with an outside diameter of 25 mm, there being ninety-three internal channels of hydraulic diameter Dh=1.6 mm mounted in DN 100 and DN 350 casings defined by their inside diameters, each rigid structure arranged in accordance with the description of the invention terminating in end plates, which plates are connected to the casing via respective single sealing gaskets.

The maximum distance d between the porous columns of 8.1 mm corresponds to the distance that, in the prior art, lies between filter elements having an outside diameter of 25 mm when they are installed in such industrial casings.

When this distance decreases, as is made possible by the separator element of the present invention, the compactness of the casings increases.

TABLE 7

|   | Dh = 1.6 mm Inside diameter of the casing | |
|---|---|---|
| D | DN100 110 mm | DN350 349 mm |
| 8.1 mm | 375 m²/m³ | 527 m²/m³ |
| 0.5 mm | 696 m²/m³ | 851 m²/m³ |
| Improvement in compactness | +86% | +61% |

This example illustrates the situation of columns that are circular in section, however the invention may be applied to columns that are of non-circular section. Table 8 below gives compactness in $m^2/m^3$ for separator elements 1 in accordance with the invention mounted in a DN 200 casing having an inside diameter of 213 mm with e=0.9 mm and d=0.5 mm and for five different hydraulic diameters.

TABLE 8

| Dh | 1.6 | 2.3 | 3.47 | 4.6 | 6 | 6 | 6 |
|---|---|---|---|---|---|---|---|
| Prior art industrial configuration | 93 cx 528 | 39 cx 431 | 23 cx 290 | 11 cx 216 | 8 cx 172 | 7 cx 136 | 19 cx 120 |
| e = 0.9 mm | Columns with a plurality of channels | | | Columns with one channel | | | |
| d = 0.5 mm | 93 cx 887 | 39 cx 724 | 23 cx 488 | 1 chan 350 | 1 chan 316 | 1 chan 316 | 1 chan 316 |
| improvement % | 67 | 67 | 67 | 62.2 | 83.9 | 131.4 | 162.4 |

In preferred embodiments in which each porous column 3 has one or more channels 5, the thickness e of the porous material preferably lies in the range 0.250 mm to 2.500 mm, and the distance d between the porous columns 3 preferably lies in the range 0.250 mm to 5.000 mm.

Another advantage of the invention relates to simplifying mounting such a separator element 1 in accordance with the invention in a separator module 11 made in any conventional manner. Specifically, the presence of inlet and outlet plates serving to assemble a plurality of porous columns together also makes it easier to achieve sealing with the casing, and in particular serves to limit the number of sealing gaskets that need to be used compared with prior art solutions.

As can be seen more precisely in FIG. 3, such a separator element 1 is mounted at the ends of the casing 12 using plates 7, 8. For this purpose, respective sealing gaskets 14 are mounted on the periphery $7_3$, $8_3$ of the plates 7, 8. These two sealing gaskets 14 are mounted by any appropriate means relative to the ends of the casing so as to close the peripheral space 4 for recovering the filtrate that is removed from the casing via an outlet 15 or via any appropriate known means.

In the example shown in FIG. 3, the separator device 11 has a single separator element 1 with a number of porous columns 3 that is selected so as to obtain the desired filter surface area. Naturally, the separator device 11 may have a plurality of separator elements 1 in accordance with the invention. Under such circumstances, each separator element 1 is mounted in sealed manner in the casing 12 using plates 7, 8 provided with sealing gaskets 14.

Thus, in the invention, there is no longer any need to use individual or single gaskets that are specific to the filter elements, and it can thus be advantageous to use gaskets that are not specific (O-rings, squares, lip gaskets, . . . ) obtainable from gaskets manufacturer catalogs, thereby enabling the required sealing to be achieved between the permeate collection chamber and the chambers that are upstream and downstream of the module.

In a preferred variant of the invention, the porous columns 3 are all identical in shape. In the example shown in the figures, all of the porous columns 3 are in the form of cylinders of circular section. Naturally, provision could be made for the porous columns 3 to present shapes that are different from one another.

In a preferred variant of the invention the porous columns 3 are cylindrical in shape. The section of the porous columns 3 may be circular or other.

In a preferred variant of the invention, the porous columns 3 possess identical transverse dimensions. In other words, the thickness e of the porous columns 3 is identical for all of the porous columns 3. Naturally, provision may be made for the porous columns 3 to present transverse dimensions that are different.

According to an advantageous embodiment characteristic, the rigid columns 3 possess outside shapes that are constant or that vary along their length, i.e. between the plates 7, 8. These rigid columns 3 possess, optionally in combination with the above shape characteristic, transverse dimensions that are constant or that vary along their length.

Figure 2:
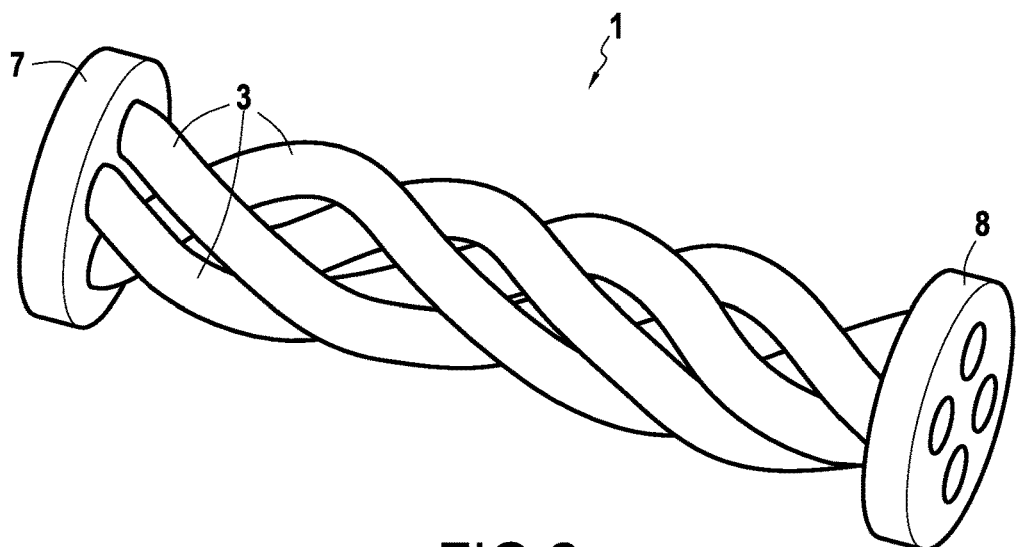
FIG. 2 is a perspective view of another embodiment of a separator element in accordance with the invention in which the porous columns are intertwined.

In the example shown in FIG. 1, the porous columns 3 extend in straight lines, being positioned in parallel with one another. It should be observed that the porous columns 3 could extend helically, as shown in FIG. 2, thereby making it possible to create a turning flow for the fluid that is to be treated. In this variant embodiment, each porous column is constructed by turning a circular or other section about its central axis, the generator section remaining either perpendicular to the central helix (coil), or horizontal (twisted column), or else vertical, i.e. parallel to the central axis (spiral staircase).

In another variant embodiment, the porous columns 3 are intertwined, as shown in FIG. 2.

The invention is not limited to the embodiments described and shown since various modifications can be made thereto without going beyond the ambit of the invention.

What is claimed is:

1. A method of manufacturing a separator element for obtaining molecular and/or particulate separation of a fluid medium for treatment into a filtrate and a retentate, the method comprising:
    implementing a single operation of an additive method of fabrication of a material to form a single-piece rigid structure that is uniform and continuous throughout, and without any bonds or exogenous additions,
    wherein the formed single-piece rigid structure comprises:
    at least two porous rigid columns having outer walls, said at least two porous rigid columns being made of a same material, and positioned side by side to define a volume for recovering the filtrate outside the outer walls;
    an inlet plate at a first end of the at least two porous rigid columns; and
    an outlet plate at a second end of the at least two porous rigid columns;
    wherein the inlet plate and the outlet plate are not separate parts fitted onto the at least two porous rigid columns; and
    wherein each column of the at least two porous rigid columns has an open structure, and each column comprises an inlet opening at the first end, and an outlet opening at the second end.

2. The method according to claim 1, wherein the at least two porous rigid columns have a constant shape along their length.

3. The method according to claim 1, comprising forming the at least two porous rigid columns with transverse dimensions that are constant.

4. The method according to claim 1, comprising forming the inlet and outlet plates out of the same material as the at least two porous rigid columns, so that the inlet and outlet plates, and the at least two porous rigid columns, have a same porous texture and identity and continuity of material.

5. The method according to claim 1, comprising forming each of the inlet and outlet plates with a leak tight outside face.

6. The method according to claim 1, comprising forming the inlet and outlet plates with a right section that is circular.

7. The method according to claim 1, comprising forming the inlet and outlet plates with a right section that is non-circular.

8. The method according to claim 1, comprising securing the at least two porous rigid columns to one another via at least one connection bridge made of the same material as the inlet and outlet plates and the at least two porous rigid columns.

9. The method according to claim 1, comprising forming the at least two porous rigid columns with separate and different shapes from each other.

10. The method according to claim 1, comprising forming the at least two porous rigid columns with transverse dimensions that are identical.

11. The method according to claim 1, comprising forming each column of the at least two porous rigid columns in a cylindrical shape.

12. The method according to claim 1, comprising forming each column of the at least two porous rigid columns in a helical shape.

13. The method according to claim 1, comprising intertwining together the at least two porous rigid columns.

14. The method according to claim 1, comprising forming internal open structures in the at least two porous rigid columns, wherein said open structures are identical for the at least two porous rigid columns, or different for at least one of the at least two porous rigid columns.

15. The method according to claim 1, wherein each one of the at least two porous rigid columns includes a single channel as its open structure.

16. The method according to claim 1, comprising forming each of the at least two porous rigid columns with an outer wall and a peripheral wall of a thickness between the open structure and the outer wall, said thickness lying in the range 0.25 mm to 5 mm, and wherein the distance between the at least two porous rigid columns lies in the range 0.125 mm to 10 mm.

17. The method according to claim 1, comprising forming the open structure as a plurality of channels, wherein each channel of the plurality of channels has a peripheral wall facing an outer wall of each column of the at least two porous rigid columns.

18. The method according to claim 1, further comprising depositing at least one separator layer for the fluid medium on the surface of the open structure that comes into contact with the fluid medium.

19. The method according to claim 1, comprising forming the at least two porous rigid columns and the inlet and outlet plates from an organic material.

20. The method according to claim 1, comprising forming the at least two porous rigid columns and the inlet and outlet plates from a ceramic selected from the group consisting of oxides, nitrides, carbides, and mixtures thereof.

21. The method according to claim 1, comprising forming the at least two porous rigid columns and the inlet and outlet plates from a non-metallic inorganic material.

22. The method according to claim 1, comprising forming the at least two porous rigid columns and the inlet and outlet plates from a pure metal, or from an alloy of the pure metal, or from stainless steel.

23. The method according to claim 1, comprising forming the at least two porous rigid columns and the inlet and outlet plates from a ceramic selected from the group consisting of titanium oxide, alumina, zirconia, and mixtures thereof, titanium nitride, aluminium nitride, boron nitride, and silicon carbide.

24. The method according to claim 1, comprising forming the at least two porous rigid columns and the inlet and outlet plates from aluminium, zinc, copper, or titanium, or from an alloy of a mixture thereof, or from stainless steel.

25. The method according to claim 1, wherein the at least two porous rigid columns have a variable shape along their length.

26. The method according to claim 1, comprising forming each column of the at least two porous rigid columns with identical shapes.

27. The method according to claim 1, comprising forming the at least two porous rigid columns with separate and different transverse dimensions from each other.

28. The method according to claim 1, comprising forming the at least two porous rigid columns with transverse dimensions that vary along their length.

* * * * *